United States Patent Office 3,534,094
Patented Oct. 13, 1970

3,534,094
PRODUCTION OF α,ω-DIAMINOALKANE
CARBOXYLIC ACIDS
Karl-Heinz Koenig and Horst Pommer, Ludwigshafen
(Rhine), Germany, assignors to Badische Anilin- &
Soda-Fabrik Aktiengesellschaft, Ludwigshafen (Rhine),
Germany
No Drawing. Filed Sept. 26, 1966, Ser. No. 581,731
Claims priority, application Germany, Oct. 1, 1965,
1,296,642
Int. Cl. C07c 101/24
U.S. Cl. 260—534                              10 Claims

ABSTRACT OF THE DISCLOSURE

Production of α,ω-diaminoalkane carboxylic acids by reacting an α,ω-dihaloalkanoic acid or an alkali metal, ammonium or alkaline earth metal salt thereof with hexamethylene tetramine in aqueous medium at a pH value of 3 to 11 at a temperature of −10° to 70° C. when the pH value is above 9 or −10 to 130° C. when the pH value is not more than 9. The reaction can be carried out in two stages via the intermediately formed aminohaloalkane carboxylic acid. α,ω-diaminoalkane carboxylic acids such as ornithine or lysine are essential amino acids which can be added to animal food.

---

This invention relates to a process for the production of α,ω-diaminoalkane carboxylic acids.

α,ω-diaminoalkane carboxylic acids, for example lysine, ornithine, arginine or citrulline, are known to play an important part in living nature. They are therefore being synthesized to an increasing extent, for example to supplement the calories in human and animal food. Economical methods for the production of these diaminoacids have not hitherto been known. In J. Am. Chem. Soc., 71, 3161 (1949), and 72, 5137 (1950), it is stated that 2,6-diaminocaproic acid can be obtained from 2,6-dibromocaproic acid after reaction with ammonia for four days at 55° to 60° C. or by heating for twelve hours with a mixture of ammonia, ammonium carbonate and copper chloride at 175° to 200° C. This did not stand up to examination by a third party (cf. J. Am. Chem. Soc. 73, 4979–80 (1951). It is known from British Patent specification No. 921,028 that piperidine carboxylic acid is obtained very easily and in good yields from 2-chloro-6-bromocaproic acid and ammonia. It is known from the J. Org. Chem. 27, 1241 (1962), that in the aminolysis of 2,5-dichlorovaleric acid there are no indications of the formation of 2,5-diaminovaleric acid (ornithine) because cyclization reactions to different reaction products take place. It is also known that α-monohalocarboxylic acids with hexamethylene tetramine give the corresponding α-aminocarboxylic acids. In U.S. patent specification No. 3,215,736 it is expressly stated that this method can only be used when the halocarboxylic acids contain a halogen atom in α-position to the carboxylic group and not in any other position.

It is an object of the invention to provide a simple process for the production of α,ω-diaminoalkane carboxylic acids. It is another object of the invention to provide a process for the reaction of α,ω-dihaloalkane carboxylic acids with hexamethylene tetramine. These and other objects and advantages of the invention will be better understood from the following detailed description.

We have found that α,ω-diaminoalkane carboxylic acids are obtained by reacting an α,ω-dihaloalkane carboxylic acid or an alkali metal salt, ammonium salt or alkaline earth metal salt thereof with hexamethylene tetramine in aqueous medium at a pH value of from 3 to 11, if desired in two stages via an intermediately formed (and if desired isolated) α-amino-ω-haloalkane carboxylic acid or α-halo-ω-aminoalkane carboxylic acid or a hexamethylene tetramine adduct of the same, at a temperature of from −10° to 70° C. if the pH value is 9 or more or a temperature of −10° to 130° C. if the pH value is less than 9.

Although it was to be expected from U.S. patent specification No. 3,215,736 that it would be possible to react the α-halogen atom in the α,ω-dihalocarboxylic acids, it could by no means be predicted that the halogen in terminal position would also be replaced by an amino group, especially since halogen atoms in positions other than the α-position to the carboxylic group were said not to enter into reaction with hexamethylene tetramine and moreover cyclization, for example to lactones, lactams or heterocyclic carboxylic acids, was to be expected.

Suitable starting materials are α,ω-dihaloalkane carboxylic acids, especially those having four to eight, particularly five to six, carbon atoms and particularly the chlorine and bromine compounds or, when easily accessible, the iodine compounds. The halogen atoms may be of the same kind or of different kinds. As a rule, when the halogen atoms are the same, the α-halogen atom is the first to react and when the halogen atoms are different in a dihalogen carboxylic acid the halogen atom having the higher atomic weight is the first to react. If it is desired to carry out the reaction in stages, it is preferred to use dihalocarboxylic acids having different halogen atoms whose halogen atom having the higher atomic weight is situated in the position where replacement of the halogen by the amino group should take place first. Examples of suitable α,ω-dihaloalkane carboxylic acids are 2,4-dichlorobutyric acid, 2-bromo-4-chlorobutyric acid, 2,5-dichlorovaleric acid, 2,5-dibromovaleric acid, 2-chloro - 5 - bromovaleric acid, 2-bromo-5-chlorovaleric acid, 2-iodo-5-chlorovaleric acid, 2,6-dichlorocaproic acid, 2,6-dibromocaproic acid, 2-chloro-6-bromocaproic acid, 2-bromo-6-chlorocaproic acid, 2,7-dichloroheptanic acid, 2,8-dichlorocapric acid or 2,8-dibromocapric acid. Although the process may also be carried out with the corresponding fluorocarboxylic acids, these starting materials have only minor importance owing to the fact that they are not readily accessible. The alkali metal, alkaline earth metal or ammonium salts of the acids may often be used instead of the free acids. The reaction of the dihaloalkane carboxylic acids may also be carried out in the presence of alkali metal, alkaline earth metal, ammonium or amine halides whose halide ion is derived from a halogen having a higher atomic weight than one of the two halogen atoms or than both halogen atoms of the dihalocarboxylic acid. Even when less than a stoichiometric amount of these halides is used, acceleration of the reaction is achieved by such additions.

A number of methods are known for the production of $\alpha,\omega$-dihaloalkane carboxylic acids, for example halogenation of $\omega$-haloalkane carboxylic acids or hydrolysis of $\alpha,\alpha,\alpha,\beta,\omega$-pentahaloalkanes.

The reaction is carried out in aqueous medium. The dihaloalkane carboxylic acids are advantageously suspended in water or preferably dissolved in water in the form of salts, concentrations of from 20 to 75% by weight having proved to be advantageous. These concentrations are however to be correlated with the amount of water which is introduced with an aqueous solution of hexamethylene tetramine. It is advantageous to use solutions of hexamethylene tetramine which are as concentrated as possible, for example 30 to 45% by weight or more highly concentrated. Mixtures of aqueous formaldehyde and ammonia (which behave like hexamethylene tetramine) may also be used. Since an adduct of hexamethylene tetramine to the dihaloalkane carboxylic acid or the aminohaloalkane carboxylic acid is first formed in the reaction and this then dissociates, with elimination of formaldehyde, with the formation of a betaine of the diaminoalkane or aminohaloalkane carboxylic acid, the formaldehyde which had been eliminated can be intercepted by adding ammonia. In this procedure hexamethylene tetramine need only be added at the beginning of the reaction, this later being formed again, as it were catalytically, from the eliminated formaldehyde and the ammonia which is supplied continuously at an appropriate rate. Amination is achieved in this way without an excess of ammonia being used. In general it is sufficient if at the beginning of the reaction 0.1 to 1 mole of hexamethylene tetramine is added per mole of dihaloalkane carboxylic acid, provided that in the course of the reaction ammonia is added continuously at the rate which is necessary to maintain the reaction mixture the pH value required for the reaction. In general an excess of hexamethylene tetramine, for example 1 to 50 moles, particularly 1 to 20 moles, per mole of dihaloalkane carboxylic acid, is used if ammonia is not supplied continuously. Even when monoamino-monohaloalkane carboxylic acid only is prepared in the first stage, an excess of hexamethylene tetramine may be used, although in this case it is advantageous to use hexamethylene tetramine in a molar ratio of 0.3 to 3.5 per mole of dihaloalkane carboxylic acid and in the second stage (the reaction of the aminoalkane carboxylic acid) 0.1 to 3 moles of hexamethylene tetramine per mole of aminohaloalkane carboxylic acid.

The reaction takes place in a weakly acid to weakly alkaline range at pH values of from 3 to 11. It may be advantageous to begin the reaction in a weakly alkaline range and to end it in a weakly acid range.

It is advantageous to neutralize the $\alpha,\omega$-dihaloalkane carboxylic acid with ammonia at the beginning of the reaction if an alkali metal, alkaline earth metal or ammonium salt is not being used from the start, and to bring the salt solution together with a solution of hexamethylene tetramine which is as concentrated as possible, but whose amount is not sufficient to carry the reaction to completion. Subsequently ammonia is introduced in the form of gas or an aqueous solution, preferably a more than 5% solution, with continuous pH control.

The reaction of hexamethylene tetramine with dihaloalkane carboxylic acids takes place even at $-10°$ C., albeit very slowly. Since the reaction, as already stated, takes place in stages by way of the monoaminomonohalo compound, the latter is first formed. It may easily be isolated, particularly if the reaction temperature is kept below $+40°$ C. It has in fact been found that the hexamethylene tetramine adduct to the $\omega$-position halogen of the dihaloalkane carboxylic acid or $\omega$-halo-$\alpha$-aminoalkane carboxylic acid is more readily soluble in water than the betaine of the $\omega$-halo-$\alpha$-aminoalkane carboxylic acid so that this sparingly soluble betaine may be separated comparatively easily in crystalline form from the hexamethylene tetramine/$\omega$-halo-$\alpha$-aminoalkane carboxylic acid adduct and/or the dihaloalkane carboxylic acid. On the other hand the $\omega$-hexamethylene tetramine/$\alpha$-amino-$\omega$-haloalkane carboxylic acid adduct may be converted into the free diaminoalkane carboxylic acid by heating (but not above 130° C.). Cleavage of the hexamethylene tetramine adducts first formed takes place at a lower temperature in the case of an adduct in $\alpha$-position than in the case of an adduct in $\omega$-position. If the primary reaction product is the $\alpha$-hexamethylene tetramine/$\alpha,\omega$-dihaloalkane carboxylic acid adduct, the reaction of the hexamethylene tetramine with the $\alpha$-halogen atom as a rule takes place more rapidly than the cleavage of the $\omega$-hexamethylene tetramine adduct. If it is desired to carry out the reaction of the $\alpha,\omega$-dihaloalkane carboxylic acid to the diaminoalkane carboxylic acid with hexamethylene tetramine in one stage, it is advisable to allow the reaction to proceed at higher temperatures. The upper temperature limit which is permissible depends substantially on the pH value of the reaction mixture. In the alkaline range above pH 7, particularly above pH 9, heating to about 50° to 70° C. is permissible, whereas in the weakly alkaline range or particularly in the acid range, i.e. below pH 9, particularly below pH 7, heating to about 130° C. is permissible. For reasons of vapor pressure it may be advantageous to use a pressure above atmospheric pressure. Side reactions and secondary reactions, for example cyclization, take place at higher temperatures.

The duration of the reaction also depends on the reaction temperature. In the production of $\alpha$-amino-$\omega$-haloalkane carboxylic acids or $\omega$-amino-$\alpha$-haloalkane carboxylic acids, the reaction period is about six to twelve hours at room temperature. At 80° C. the reaction proceeds almost to the diaminoalkane carboxylic acid within only one hour.

The following procedure may be adopted for example for working up the reaction products:

When preparing the $\alpha$-amino-$\omega$-halocarboxylic acids the reaction is as a rule allowed to proceed so that at the end of the reaction there is a weakly acid pH value. At this pH value the $\alpha$-amino-$\omega$-halocarboxylic acids are sparingly soluble in water and need only to be suction filtered and if necessary recrystallized. In the synthesis and working up of the $\alpha,\omega$-diaminocarboxylic acids the procedure may for example be that first of all excess hexamethylene tetramine is extracted with halohydrocarbons in a weakly acid or alkaline range or the sparingly soluble hexamethylene tetramine is removed by fractional crystallization after the aqueous solution has been concentrated. The mother liquor then contains the readily soluble $\alpha,\omega$-diaminocarboxylic acid and the ammonium salt which may be separated after crystallization and after at least substantial drying by alcohol.

The invention is illustrated by the following examples.

EXAMPLE 1

93 parts by weight of $\alpha,\epsilon$-dichlorocaproic acid is mixed with 38 parts by weight of aqueous concentrated ammonia. A solution of 140 parts by weight of hexamethylene tetramine in 200 parts by weight of water is introduced into this solution. The reaction mixture is slowly heated to 100° C. and a pH value of 9 is kept constant by introducing a weak current of gaseous ammonia with constant pH control. Somewhat more ammonia is required in the first hour of the reaction than in the next three hours. Introduction of ammonia is stopped after a reaction period of four hours at 90° to 100° C., the mixture is allowed to cool and the hexamethylene tetramine is extracted countercurrently with methylene chloride or chloroform. The aqueous solution is acidified with hydrochloric acid and concentrated under subatmospheric pressure. The concentrate is cooled and the lysine hydrochloride which separates in solid form is taken up in ethyl alcohol, suction filtered from insoluble ammonium chloride and the aminoacid is precipitated by adding ether. 64 parts by weight of α,ε-diaminohexanoic acid dihydrochloride (59.2% of the theory) is obtained.

The d,l-lysine dihydrochloride may be converted in an approximately 95% yield into d,l-lysine monohydrochloride by known methods by adding the calculated amount of pyridine in alcoholic solution (see Org. Syn. omnibus volume II, (1943), 374). It has a melting point of 260° to 264° C. with decomposition.

EXAMPLE 2

520 parts by weight of water is added while cooling with ice water to 93 parts by weight of α,ε-dichlorocaproic acid, 5 parts by weight of ammonium iodide and 420 parts by weight of hexamethylene tetramine. Gaseous ammonia is passed into the mixture until a pH value of 9.7 has been set up and the mixture is then heated to 70° to 80° C. The pH value is kept at 9.5 to 9.8 by introducing a weak stream of gaseous ammonia. The reaction is completed (chloride determination) after two to three hours. Introduction of ammonia is stopped, the reaction mixture is heated for a short time under subatmospheric pressure so that excess ammonia is substantially expelled and the excess hexamethylene tetramine (which can be reused) is removed by continuous, cold, countercurrent extraction with chloroform. Hydrogen chloride gas is passed into the aqueous phase until a strongly acid reaction has been set up, the whole is concentrated under subatmospheric pressure, the ammonium chloride is separated by adding methanol and acetone or ether is added to the methanol solution to precipitate the lysine dihydrochloride. 73 parts by weight is obtained, equivalent to 67% of the theory.

EXAMPLE 3

α,δ-dichlorovaleric acid is used instead of α,ε-dichlorocaproic acid, the procedure being otherwise the same as in Example 2. A 65.5% yield of d,l-ornithine dihydrochloride is obtained.

EXAMPLE 4

720 parts by weight of α-bromo-ε-chlorocaproic acid is suspended in 370 parts by weight of water and 284 parts by weight of concentrated aqueous ammonia is slowly added while cooling to 10° to 35° C. 540 parts by weight of hexamethylene tetramine is gradually introduced while stirring well and the mixture is stirred overnight at room temperature with slight cooling. The pH value thus falls slowly from 9.6 to 5.1. The solid is suction filtered and 465 parts by weight of crude α-amino-ε-chlorocaproic acid is obtained which still contains a small amount of hexamethylene tetramine adduct which has not been dissociated. After the product has been recrystallized from water (heating for only a short time being permissible), small white leaflets of α-amino-ε-chlorocaproic acid having a melting point of 159° to 160° C. are obtained. The yield is equivalent to 94% of the theory.

Conversion of the α-amino-ε-chlorocaproic acid into α,ω-diaminocaproic acid is effected by heating approximately molar amounts of hexamethylene tetramine and α-amino-ε-chlorocaproic acid in aqueous solution at a pH value of 4.5 to 8.5.

EXAMPLE 5

880 parts by weight of hexamethylene tetramine is suspended in 600 parts by weight of water. With slight external cooling 720 parts by weight of α-bromo-ε-chlorocaproic acid is introduced and then the reaction mixture is stirred at room temperature for about sixteen to twenty hours with simultaneous slight cooling. The pH value of the mixture falls from 9.0 to 5.4.

By suction filtration 472 parts by weight of crude α-amino-ε-chlorocaproic acid is obtained (i.e. 95.5% of the theoretical yield) and this can be purified by recrystallization from hot water (in small portions and heated for only a short time). The melting point is then 160° to 161° C. It may be converted into α,ω-diaminocaproic acid in a second stage as described in Example 4.

EXAMPLE 6

216 parts by weight of α-bromo-δ-chlorovaleric acid is introduced into 94 parts by weight of concentrated aqueous ammonia while cooling with ice. 140 parts by weight of hexamethylene tetramine is then added at room temperature while stirring well and cooling by means of cold water. After two to three hours the mixture is allowed to react for another ten to fifteen hours at room temperature. The solid is suction filtered and washed with a small amount of acetone. 146 parts by weight (96.5% of the theory) of α-amino-δ-chlorovaleric acid is obtained in the form of white flakes having a melting point of 173° to 175° C. after having been recrystallized by heating for a short time in water. The α-amino-δ-chlorovaleric acid may be converted into α,δ-diaminovaleric acid (ornithine) by a method analogous to that described in Example 4.

We claim:

1. A process for the production of α,ω-diaminoalkane carboxylic acids of 5 to 6 carbon atoms, wherein an α,ω-dihaloalkanoic acid of 5 to 6 carbon atoms or an alkali metal, ammonium or alkaline earth metal salt thereof is reacted with hexamethylene tetramine in aqueous medium at a pH value of 3 to 11 at a temperature of −10° to 70° C. when the pH value is above 9 or −10° to 130° C. when the pH value is not more than 9, the molar ratio of said acid or salt thereof to hexamethylene tetramine being from 1:1 to 1:50.

2. A process as claimed in claim 1 wherein the reaction is carried out in two stages via the intermediately formed α-amino-ω-haloalkane carboxylic acid, α-halo-ω-aminoalkane carboxylic acid or hexamethylene tetramine adducts thereof.

3. A process as claimed in claim 2 wherein the intermediate product is isolated.

4. A process as claimed in claim 2 wherein the α-amino-ω-haloalkane carboxylic acid or α-halo-ω-aminoalkane carboxylic acid is prepared from the α,ω-dihaloalkane carboxylic acid or a salt thereof in a first stage at a temperature of −10° to +50° C. and the formation of the α,ω-diaminoalkane carboxylic acid is completed in a second stage at up to 130° C.

5. A process as claimed in claim 1 wherein a α,ω-dihaloalkane carboxylic acid is used whose α-halogen atom has a higher atomic weight than the ω-halogen atom and the α-amino-ω-haloalkane carboxylic acid obtained in a first stage is reacted to form α,ω-diaminoalkane carboxylic acid.

6. A process as claimed in claim 2 wherein a α,ω-dihaloalkane carboxylic acid is used whose α-halogen atom has a higher atomic weight than the ω-halogen atom and the α-amino-ω-haloalkane carboxylic acid obtained in a first stage is reacted to form α,ω-diaminoalkane carboxylic acid.

7. A process as claimed in claim 1 wherein an α,ω-dihaloalkane carboxylic acid is used whose ω-halogen atom has a higher atomic weight than the α-halogen atom and the ω-amino-α-haloalkane carboxylic acid obtained in a first stage is reacted to form the α,ω-diaminoalkane carboxylic acid.

8. A process as claimed in claim 2 wherein an α,ω-dihaloalkane carboxylic acid is used whose ω-halogen atom has a higher atomic weight than the α-halogen atom and the ω-amino-α-haloalkane carboxylic acid obtained in a first stage is reacted to form the α,ω-diaminoalkane carboxylic acid.

9. A process as claimed in claim 1 wherein hexamethylene tetramine is used in the form of a mixture of formaldehyde and ammonia.

10. A process as claimed in claim 1 wherein hexamethylene tetramine is allowed to form in situ from ammonia supplied during the reaction, the amount of ammonia being sufficient to maintain the pH of the reaction mixture of from 3 to 11.

References Cited

UNITED STATES PATENTS

| | | | |
|---|---|---|---|
| 2,876,218 | 3/1959 | Francis et al. | 260—534 XR |
| 3,163,672 | 12/1964 | Wineman et al. | 260—534 |
| 3,215,736 | 11/1965 | Guinot | 260—534 |
| 3,244,733 | 4/1966 | Wakasa et al. | 260—534 XR |

OTHER REFERENCES

Sales et al., J. Am. Chem. Soc., vol. 71, pp. 3163–3164 (1949).

Degering et al., J. Am. Chem. Soc., vol. 72, pp. 5137–5139 (1950).

LORRAINE A. WEINBERGER, Primary Examiner

P. J. KILLOS, Assistant Examiner

U.S. Cl. X.R.

260—404, 404.5